United States Patent
Kumar et al.

(10) Patent No.: US 9,842,593 B2
(45) Date of Patent: Dec. 12, 2017

(54) MULTI-LEVEL CONTENT ANALYSIS AND RESPONSE

(71) Applicant: AT&T INTELLECTUAL PROPERTY I, L.P., Atlanta, GA (US)

(72) Inventors: Shiv Kumar, Marlboro, NJ (US); Paritosh Bajpay, Edison, NJ (US); Anand K. Singh, Lewisville, TX (US); Satyendra Tripathi, East Brunswick, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 238 days.

(21) Appl. No.: 14/541,811

(22) Filed: Nov. 14, 2014

(65) Prior Publication Data

US 2016/0140965 A1 May 19, 2016

(51) Int. Cl.
- G06F 17/27 (2006.01)
- G10L 15/26 (2006.01)
- H04N 21/233 (2011.01)
- H04N 21/235 (2011.01)
- H04M 3/42 (2006.01)
- H04M 3/51 (2006.01)
- G10L 15/22 (2006.01)

(52) U.S. Cl.
CPC .......... G10L 15/26 (2013.01); G06F 17/2785 (2013.01); H04M 3/42221 (2013.01); H04M 3/5166 (2013.01); H04N 21/233 (2013.01); H04N 21/2353 (2013.01); G06F 17/274 (2013.01); G10L 15/22 (2013.01); G10L 15/265 (2013.01); H04M 2201/40 (2013.01)

(58) Field of Classification Search
CPC ..... G10L 15/22; G10L 15/183; G10L 15/265; G10L 15/30; G06F 17/2785; G06F 17/274
See application file for complete search history.

(56) References Cited

U.S. PATENT DOCUMENTS

| | | |
|---|---|---|
| 6,816,858 B1 | 11/2004 | Coden et al. |
| 7,039,585 B2 | 5/2006 | Wilmot et al. |
| 7,143,091 B2 | 11/2006 | Charnock et al. |
| 7,366,714 B2 | 4/2008 | Krachman |
| 8,050,923 B2 | 11/2011 | Blair |
| 8,223,932 B2 | 7/2012 | Forbes et al. |
| 8,312,057 B2 | 11/2012 | John |
| 8,442,189 B2 | 5/2013 | Michaelis et al. |

(Continued)

OTHER PUBLICATIONS

"WASP", downloaded from the internet at phon.ucl.ac.uk/resource/sfs/wasp.htm no later than Feb. 18, 2015.

(Continued)

*Primary Examiner* — Vu B Hang
(74) *Attorney, Agent, or Firm* — Greenblum & Bernstein, P.L.C.

(57) ABSTRACT

Predetermined services are provided using preset instructions. A transcript of audible content provided over an electronic network and received at a communications device is analyzed to determine whether a trigger is present in the audible content. When the trigger is present in the audible content, preset instructions correlated with the trigger and instructing how to provide a predetermined service are identified. The predetermined service is provided by following the preset instructions.

19 Claims, 9 Drawing Sheets

(56) References Cited

U.S. PATENT DOCUMENTS

| | | |
|---|---|---|
| 8,484,025 B1 | 7/2013 | Moreno et al. |
| 8,543,397 B1 | 9/2013 | Nguyen |
| 8,543,407 B1 | 9/2013 | Gagnon et al. |
| 8,560,325 B2 | 10/2013 | Kanevsky et al. |
| 8,589,161 B2 | 11/2013 | Kennewick et al. |
| 8,606,242 B2 | 12/2013 | Kedefors et al. |
| 8,655,662 B2 | 2/2014 | Schroeter |
| 8,688,453 B1 | 4/2014 | Joshi et al. |
| 8,688,459 B2 | 4/2014 | Nenov et al. |
| 8,700,396 B1 | 4/2014 | Mengibar et al. |
| 8,706,503 B2 | 4/2014 | Cheyer et al. |
| 8,713,119 B2 | 4/2014 | Lindahl |
| 8,719,009 B2 | 5/2014 | Baldwin et al. |
| 8,744,860 B2 | 6/2014 | Chang et al. |
| 8,775,454 B2 | 7/2014 | Geer |
| 8,781,821 B2 | 7/2014 | Newman |
| 2007/0233487 A1* | 10/2007 | Cohen .................. G10L 15/065 704/255 |
| 2010/0199189 A1 | 8/2010 | Ben-Aroya et al. |
| 2012/0185240 A1 | 7/2012 | Goller et al. |
| 2013/0115927 A1* | 5/2013 | Gruber .................. H04W 4/16 455/414.1 |
| 2013/0290859 A1 | 10/2013 | Venkitaraman et al. |
| 2014/0052444 A1 | 2/2014 | Roberge |
| 2014/0058732 A1 | 2/2014 | Labsky et al. |
| 2014/0149554 A1 | 5/2014 | Krishna et al. |
| 2014/0266690 A1* | 9/2014 | McKinley ............ G08B 25/006 340/539.11 |
| 2015/0371637 A1* | 12/2015 | Neubacher .............. G10L 15/26 704/235 |

OTHER PUBLICATIONS

"Speech Filing System", downloaded from the internet at phon.ucl.ac.uk/resource/sfs/ no later than Feb. 18, 2015.

"Phonology Assistant", downloaded from the internet at www-01.sil.org/computing/pa/index.htm no later than Feb. 18, 2015.

"Tazti", downloaded from the internet at pcworld.com/product/1260610/tazti.html no later than Feb. 18, 2015.

"Hierarchical classification of audio data for archiving and retrieving", downloaded from the internet at ieeexplore.ieee.org/xpl/login.jsp?reload=true&tp=arnumber=757472&url=http%3A%2 . . . no later than Feb. 18, 2015.

"Dragon Naturally Speaking", downloaded from the internet at shop.nuance.com/store/nuanceus/Custom/pbpage.resp-dragon-int-premium no later than Feb. 18, 2015.

"ViaVoice", downloaded from the internet at www-01.ibm.com/software/pervasive/viavoice/html no later than Feb. 18, 2015.

* cited by examiner

Computer**

MULTI-LEVEL CONTENT ANALYSIS AND RESPONSE

BACKGROUND

1. Field of the Disclosure

The present disclosure relates to the field of content analysis. More particularly, the present disclosure relates to using the results of content analysis to identify and respond to preset instructions.

2. Background Information

Customers can communicate with corporations in various ways including telephone calls, emails and social media. Companies may also keep records of calls, emails and social media communications. Customer communications typically involve calls to agents or agent systems, but can also involve asynchronous communications such as emails sent to email addresses or voicemails left at voicemail systems. Responses to asynchronous corporate communications, and particularly voicemails, typically involve a human listening to the voicemail, often only during business hours, and responding when deemed appropriate.

DETAILED DESCRIPTION

In view of the foregoing, the present disclosure, through one or more of its various aspects, embodiments and/or specific features or sub-components, is thus intended to bring out one or more of the advantages as specifically noted below.

In the present disclosure, analytic functionality spans audio, text and video data. The capability provided by this disclosure can use language criteria such as a keyword or phrase and temporal criteria such as a date and/or time to search content from electronic transmissions and/or recordings. The transmissions and recordings can include recorded audio conversations, presentations and programs, recorded video that includes audio, and text communications such as email and documents. The content from the transmissions and recordings can be analyzed, and correlated with preset instructions to identify whether any actions should be taken based on the analysis.

As an initial example of how multi-level content analysis and response can be used, a corporation may provide customer contact centers that involve incoming audio such as in telephone calls. A call center may record all calls involving human and/or automated agents, or selectively record only some calls involving particular callers, particular agents, particular times or dates, and so on. The call center may transcribe all recorded calls, or selectively transcribe only particular calls, such as on-demand of a supervisor. The transcription may also be performed based on preset instructions. In this example, the call center may have preset instructions to record and transcribe all calls for new agents, or agents given new responsibilities. The transcripts can be analyzed then for the presence or absence of particular keywords or phrases, such as a particular initial greeting that is always supposed to be used. The transcripts can also be analyzed for curse or slang words in accordance with preset instructions. The transcripts can be analyzed on a continuous on-going basis, periodically, or based on a particular one-time audit instruction to review past instructions.

In the initial example above, content in communications can be audited for a single recipient (agent) or for a single caller/customer. However, communications can be audited for multiple selected recipients, or even all recipients in, e.g., a call center.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
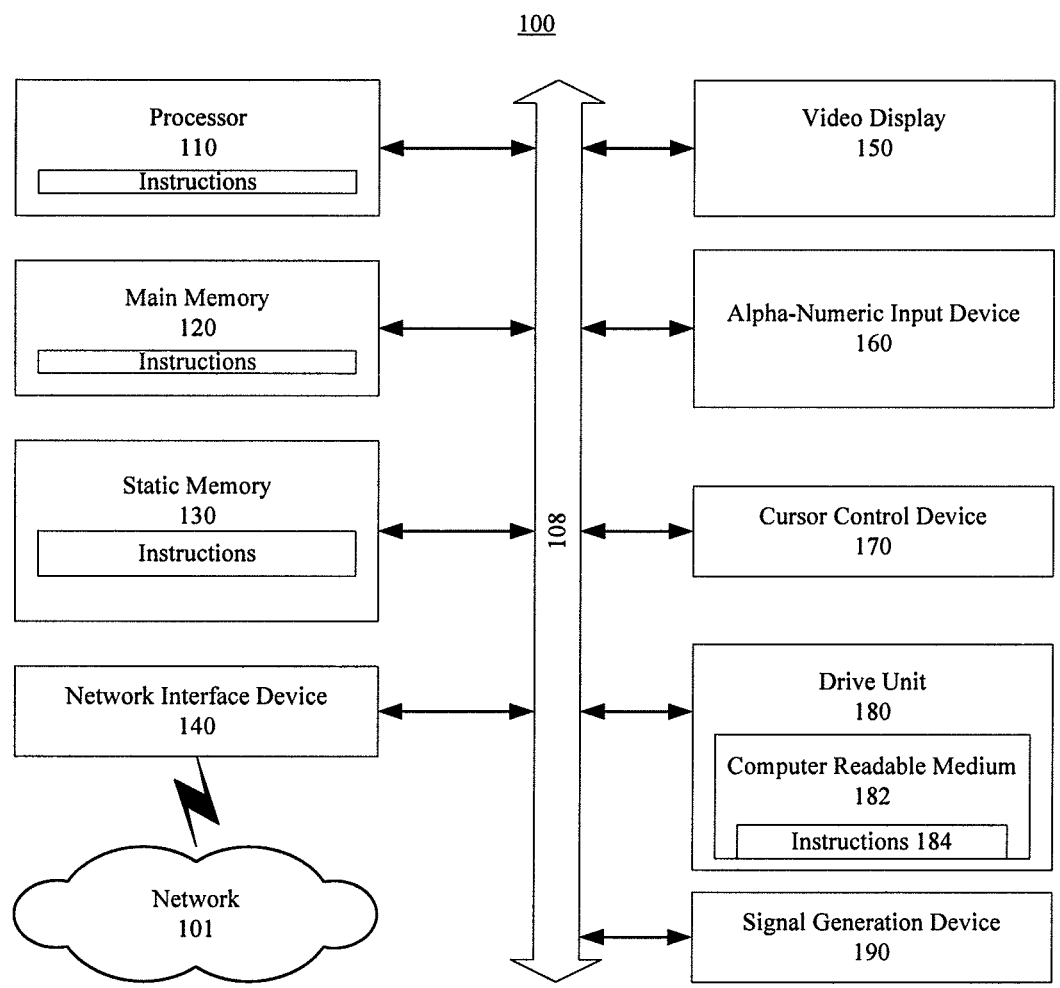
FIG. 1 shows an exemplary general computer system that includes a set of instructions for multi-level content analysis and response.

FIG. 1 is an illustrative embodiment of a general computer system, on which a method of multi-level content analysis and response can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
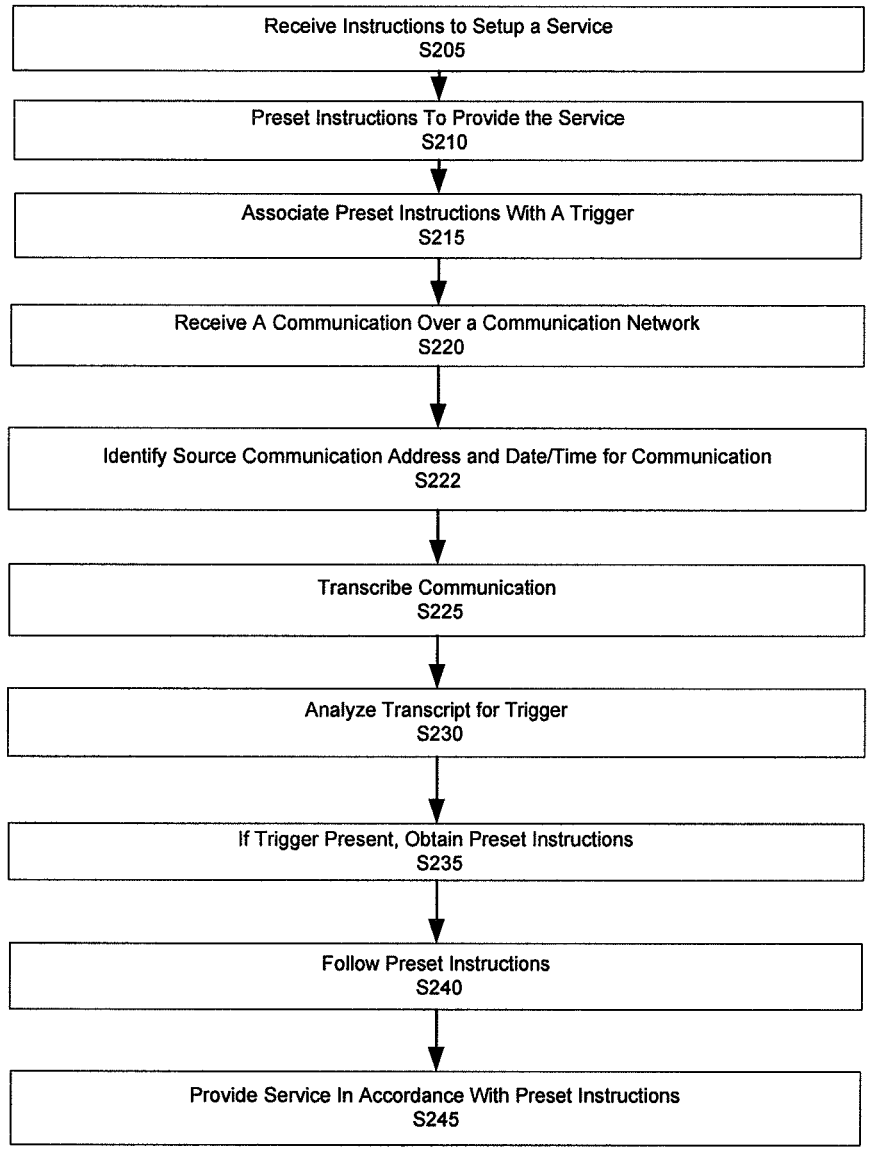
FIG. 2 shows a method for multi-level content analysis and response, according to an aspect of the present disclosure.

FIG. 2 shows a method for multi-level content analysis and response, according to an aspect of the present disclosure. In FIG. 2, instructions are received to set up a service at S205. The instructions may be received via a self-service customer portal as explained later with respect to, e.g., FIG. 6. The instructions may be received for a service that is particular to a user, such as a voicemail service. The instructions may alternatively be received for content that is available to multiple people, such as television or radio broadcast content.

At S210, instructions to provide the service are preset. The service may be provided by a third-party, independent of a network voicemail provider, content provider, broadcaster, or cable or internet service provider. The service may of course be provided by the network voicemail provider, content provider, broadcaster, cable or internet service provider, or other intermediary by which content is provided to a recipient. The service itself is a transcription and/or multi-level analysis service as described herein.

At S215, the preset instructions are associated with a trigger. A trigger may be a keyword or phrase in a transcript, a date and/or time at which content is received, a source of content, an address at which the content is received, a medium by which the content is received, and so on. A trigger can be used to initiate the transcription of content, or to take an action when the trigger is recognized in the transcript. Thus, one trigger might be to selectively transcribe a particular piece of content, and another trigger might be to take a specific action when a word or phrase is present in the transcript. Of course, multiple parameters can be set as a single trigger, such as the use of a particular word or phrase in a voicemail received at particular hours such as 9 PM to 3 AM at a voicemail account for a particular phone number. The preset instructions can be instructions to notify a particular person of the trigger, can be instructions to send an audio clip or an entire copy of content to a designated person, to automatically forward the audio clip or copy to another person or service, and so on.

At S220, a communication is received over a communication network. The received communication may be a voicemail, a video clip that includes audio, or an audio clip. The received communication can be a phone call, voicemail, text, email, or other communication sent only to specific communication addresses by a sender. Alternatively, however, a communication can be broadcast content, such as television content, radio content, or even content retrieved on-demand from a television provider, radio provider, or internet provider.

At S222, a source communication address of the communication and a date and time of the communication are identified. This identification is useful such as when an after-hours voicemail, text or email is received. As described herein, a subscriber to a multi-level analysis service may request selective transcription and analysis of received communications.

At S225, the communication is transcribed. As noted, the transcript may be a voicemail or broadcast audio. The transcription may occur based on the identification of the source communication address or the date/time of the communication. Alternatively, the communication may be a broadcast transcribed as a service for recipients of the broadcast, in which case recipients can set parameters of particular audio content for which they would like to receive notifications and so on.

At S230, the transcript is analyzed for a trigger. As noted, a trigger in a transcript may be a word or phrase. The analysis at S230 can be performed locally on customer premise equipment such as on answering machine, or can be provided within a communications network such as at a voicemail server.

At S235, if the trigger is present in the transcript, the preset instructions are obtained. Obtaining the preset instructions based on a trigger is one type of the correlation described herein, in that the trigger is correlated with the preset instructions. The preset instructions may be stored locally on customer premise equipment, or within a communications network such as in a customer profile stored by a communications service provider.

At S240, preset instructions are followed. Specifically, the preset instructions are read, and if all conditions set in the preset instructions are met, the action or actions specified in the instructions are taken.

At S245, the service is provided in accordance with the preset instructions. As described herein, a service may include providing a simple notification, or may include forwarding some or all of the audio or transcript of the audio to the intended recipient or an alternative designated by the intended recipient.

The service at S245 may also be a more complex service, such an action taken in authorizing a prescription refill. In the prescription refill, a physician may receive a voicemail after-hours, and have the voicemail transcribed selectively in accordance with preset instructions based on identification of a source of the voicemail as a customer of the physician. That is, the source of the voicemail can be identified by a calling party phone number or IP address, or even by speech recognition. Once verified, the action may include checking to see if the source is on a list for which refills are to be re-authorized by the physician. If authorized, the instructions may include sending the prescription refill authorization to the customer's pharmacy. In this way, the entire process of authorizing and ordering a prescription refill can be performed automatically with automated systems such as when a physician is unavailable after hours.

Figure 3:
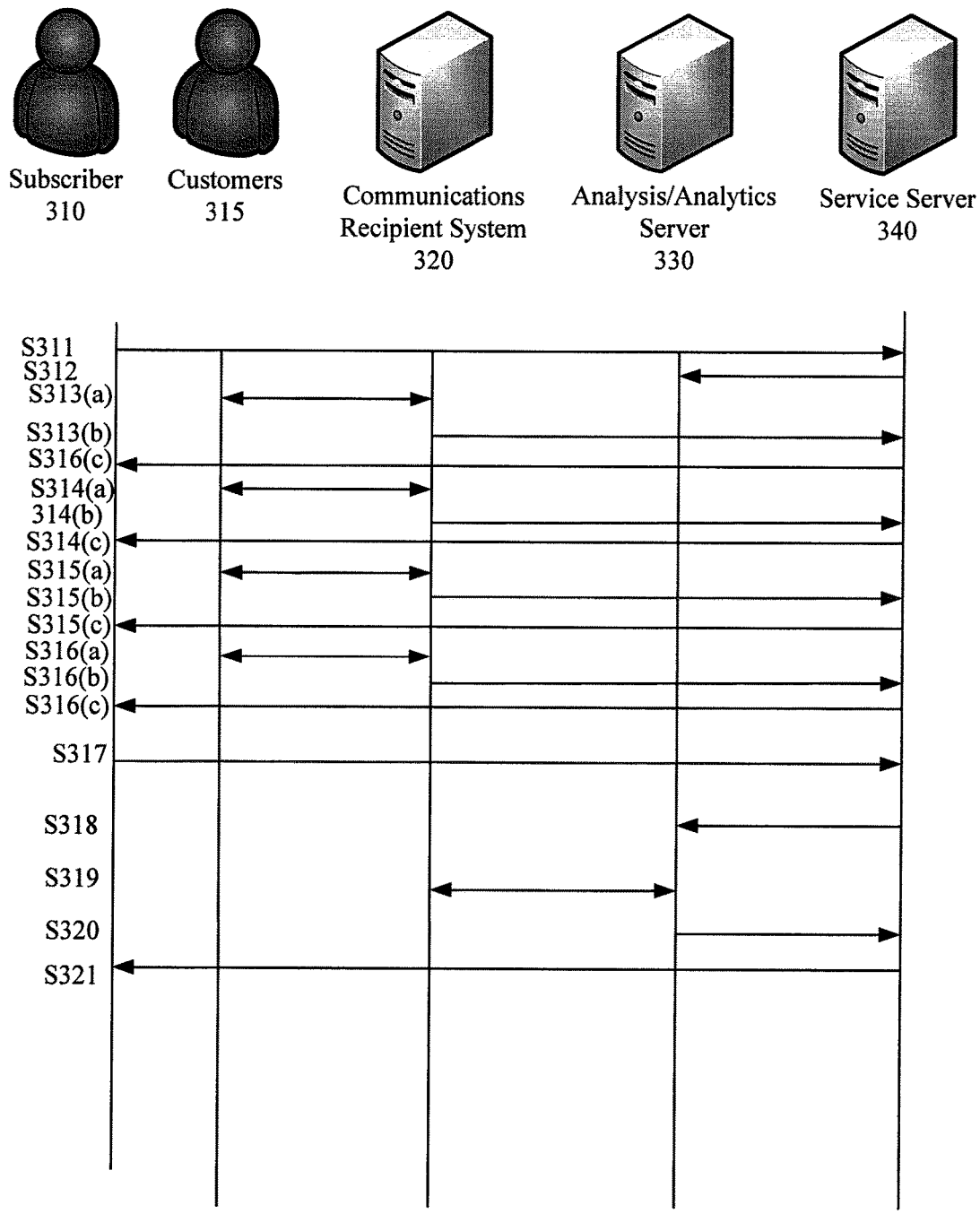
FIG. 3 shows a communication flow for multi-level content analysis and response, according to an aspect of the present disclosure.

FIG. 3 shows a communication flow for multi-level content analysis and response, according to an aspect of the present disclosure. In FIG. 3, the communications elements include a subscriber 310, customers 315, a communications recipient system 320, an analysis/analytics server 330, and a service server 340.

The subscriber 310 is the person or entity (e.g., corporation, governmental entity, social organization etc.) that sets preset instructions with a service that provides the service server 340. The subscriber may be a wireless network subscriber with a voicemail account, a cable or internet or satellite television subscriber with a cable or internet or satellite television account, or a business with multiple employees.

The customers 315 in FIG. 3 are persons or entities that provide audio content to the subscriber 310, such as to make a request. In an example where the subscriber 310 is a physician or other medical service provider, customers 315 may be patients or persons acting on behalf of patients. Of course, in other embodiments, the persons or entities providing content are not customers of the subscriber; instead the subscriber 310 may in fact be a subscriber also of the persons or entities providing content such as when 315 represents a unidirectional broadcast content provider (e.g., cable, satellite or internet television) that provides content for news and entertainment to the subscriber 310.

The communications recipient system 320 is a system that receives communications from the customers 315 on behalf of the subscriber 310. In FIG. 3, the communications recipient system may be a smart phone, television or smart television, voicemail system including a network provider's voicemail system, portable/laptop or desktop computer, or any other device by which a subscriber 310 can receive, retrieve or otherwise access audio content sent to the subscriber 310.

Applications can use application-programming interfaces (APIs) to invoke the capabilities described herein. For example, a smartphone application on a smart phone (communications recipient system 320) may be provided with access to an internet video content site, a network provider's voicemail service, or a corporate self-care website via different application programming interfaces. The user can use such a smartphone application to set preset instructions, to run analytics on existing content, to retrieve transcripts, links or audio clips, and so on.

The analysis/analytics server 330 analyzes communications from the customers 315 that are received at the communications recipient system 320. In FIG. 3, the analysis/analytics server 330 may be a third-party system that accesses the communications recipient system 320, or may be integrated or even the same as the communications recipient system 320. That is, transcription and analysis as described herein may be performed by the same overall system that received content for a subscriber 310, or may be performed by a separate system. In embodiments described below, the transcription and analysis may even be performed by the source of the content, such as by a content provider, broadcaster, or cable or satellite television service provider. In the embodiment of FIG. 3, however, the transcription and analysis is performed selectively for a subscriber 310, such as in the case where the subscriber 310 wishes to have voicemails to a business number checked when they are received after hours.

The analysis/analytics server 330 may also interact with service server 340 to receive analysis instructions on behalf of the subscriber 310. The service server 340 provides services for the subscriber 310 in accordance with preset instructions, and may be used to control the analysis/analytics server 330 and the communications recipient system 320 as described herein. As an example, the service server 340 may transcribe voicemails as a service for physicians, and check prescription refill requests against a list of patients and specific prescriptions for which refills are authorized. In this way, the service server 340 may reauthorize the refill on behalf of the physicians when the transcription and analysis by analysis/analytics server 330 reveals that the content involves a request for a prescription refill.

At S311, the subscriber 310 provides the preset instructions to the service server 340. The service server 340 may provide a self-service customer portal as shown with respect to FIG. 6 herein. At S312, the service server 340 provides instructions to the analysis/analytics server 330. The instructions to the analysis/analytics server 330 may include triggers and correlated actions to take based on the triggers. The triggers may be for when to selectively transcribe content, as well as which words or phrases to check for in content.

At S313(a), S314(a), S315(a) and S316(a), customers 315 communicate with the communications recipient system 320. S313(a), S314(a), S315(a) and S316(a) may involve, for example, different persons leaving voicemails for a physician at the physician's office number. Alternatively though, instead of customers 315 and voicemails, the content provided at S313(a), S314(a), S315(a) and S316(a) may involve broadcasts of content to the subscriber 310.

At S313(b), S314(b), S315(b) and S316(b) the communications recipient system 320 communicates with the service server 340, and at S313(c), S314(c), S315(c) and S316(c) the service server 340 communicates with the subscriber 310. The communications recipient system 320 may communicate with the service server 340 to, for example, inform the service server 340 of the receipt of content. The service server 340 may communicate with the subscriber 310 to, for example, notify the subscriber of voicemails that meet the preset instructions set by the subscriber 310.

At S317, the subscriber 310 communicates with the service server 340, and at S318 the service server 340 communicates with the analysis/analytics server 330. The communication at S317 may be, for example, the subscriber 310 providing analytics instructions to the service server 340 to analyze a group of communications received by the subscriber 310. The analytics instructions may be to check, for example, how many times a particular person has called after hours for a refill. The analytics instructions may also be to check for the percentage of calls that involve requests for prescription refills, or that involve requests for emergency consultations. In any event, the request at S317 is an instruction to provide analysis after-the-fact for multiple content received by a subscriber 310, and not just the single communications and individual content as it is received.

At S319, the analysis/analytics server 330 interacts with the communications recipient system 320. Here, the analysis/analytics server 330 may obtain the audio or transcripts of the audio to be checked in accordance with the subscriber's instructions at S317.

At S320, the analysis/analytics server 330 communicates with the service server 340, which in turn communicates again with the subscriber 310 at S321. These communications involve the analytic results being obtained and returned to the subscriber 310 via the service server 340.

An illustrative example of what is occurring in FIG. 3 involves a voicemail system which serves as the communications recipient system 320. The subscriber 310 has an account at the voicemail system/communications recipient system 320, and customers 315 leave voicemails at the account at the voicemail system/communications recipient system 320. The service server 340 is made aware of the voicemails at S313(b), S314(b), S315(b) and S316(b), and may act in accordance with the preset instructions and notify the subscriber 310.

A particular example using FIG. 3 is a pharmacy or physician that acts as subscriber 310. The pharmacy 310 fills prescriptions or the physician writes prescriptions for a pharmacy to fill). Customers 315 call the pharmacy 310 to request refills on the prescriptions. The service server 340 reviews the voicemails at the voicemail system/communications recipient system 320, and determines that the customers 315 are requesting to refill prescriptions. The service server 340 may use the preset instructions to act on the voicemails, such as by confirming that a customer 315 is authorized to refill a particular prescription and then informing the subscriber 310 to refill the particular prescription. In this way, a voicemail system 320 may be used to automatically refill prescriptions in accordance with preset instructions.

The analysis/analytics server 330 may perform periodic analysis of communications in accordance with the preset instructions. Alternatively, the analysis/analytics server 330 may perform on-demand analysis of communications in accordance with the preset instructions. The analysis/analytics server 330 may analyze the content of the communications, and/or may analyze characteristics and meta-data from the communications. For example, the analysis/analytics server 330 may analyze a transcript of each voicemail in order to determine whether content of the voicemail meets the preset instructions. Alternatively, the analysis/analytics server 330 may analyze a series of voicemail transcripts, such as from a particular customer 315 to determine whether an addressable pattern or problems is exhibited in the voicemail transcripts.

The on-demand analysis is shown in S317, S318, S319, S320 and S321. On the other hand, a periodic analysis may be ordered by the service server 340 at S312 in accordance with instructions provided by the subscriber 310 at S311.

Figure 4:
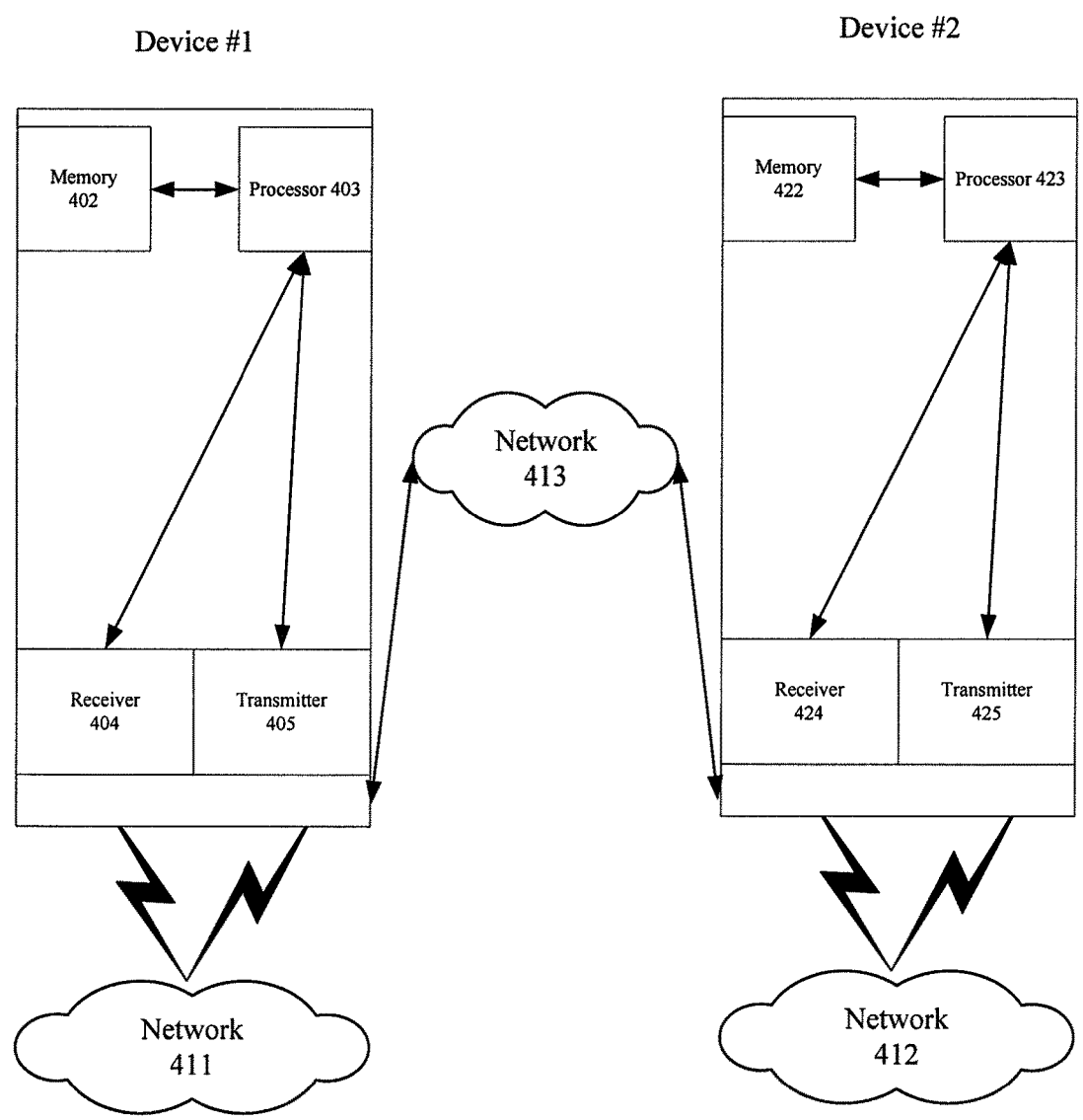
FIG. 4 shows a system of interoperable communications apparatuses for multi-level content analysis and response, according to an aspect of the present disclosure.

FIG. 4 shows a system of interoperable communications apparatuses for multi-level content analysis and response, according to an aspect of the present disclosure. In FIG. 4, two devices automatically interoperate across a network 413. Device #1 in turn communicates across network 411 and device #2 in turn communicates across network 412.

Device #1 includes a memory 402 that stores data and instructions, and a processor 403 that processes the data and executes the instructions. Device #1 also includes a receiver 404 and a transmitter 405 for communicating across the networks 411 and 413.

Device #2 includes a memory 422 that stores data and instructions, and a processor 423 that processes the data and executes the instructions. Device #2 also includes a receiver 424 and a transmitter 425 for communicating across the networks 412 and 413.

Device #1 may be, for example, the service server 340 in FIG. 3 and device #2 may be, for example, the communications recipient system 320 in FIG. 3. In the example of a voicemail system, device #2/communications recipient system 320 may receive a voicemail and notify device #1/service server 340. Either device #2/communications recipient system 320 or device #1/service server 340 may transcribe the voicemail.

Similarly, device #1 may be, for example, the analysis/analytics server 330 in FIG. 3 and device #2 may be, for example, the service server 340 in FIG. 3. Again in the example of a voicemail system, device #2/service server 340 may make or receive a transcript of a voicemail or multiple voicemails, and inform device #1/analysis/analytics server 330 to analyze the voicemail or voicemails.

The voicemail system is only an example of how device #1 and device #2 may interoperate in accordance with preset instructions. As described herein, a variety of embodiments can use interoperating devices that communicate and exchange information in accordance with preset instructions.

For example, using the embodiment of FIG. 4, an auditing server can be device #1 and serve as the analysis/analytics server 330 from FIG. 3, and a server that transcribes call center calls can be device #2 and serve as the communications recipient system 320 from FIG. 3. Device #1 may receive analytics instructions from, e.g., a supervisor, to analyze transcribed calls that meet particular criteria such as a recipient or group of recipients, an originator or group of originators, a time or time range, date or date range, communications mode(s), and so on. The transcripts can be analyzed for particular keywords or phrases, or the absence of particular keywords or phrases.

Additionally, device #1 in FIG. 4 may correlate particular transcripts with external audio, text and video data that is not from transcribed content. For example, device #1 in FIG. 4 may correlate particular calls with orders placed by agents for goods or services, or complaint tickets generated by agents, or complaints from users to supervisors or to a customer care website about how they were treated by agents. Transcripts can also be correlated with information about the callers, such as credit records, known demographic information, customer history records of the customer, and so on. In this way, patterns can be detected from correlations even long after calls are received and transcribed, such as patterns of customers quitting a service after interacting with particular agents.

That is, in the example described immediately above, device #1 may be programmed to match transcripts of calls from customers whenever a customer calls to cancel a service. This correlation can be used to automatically audit past calls to search for patterns, such as particular agents that result in excessive customer cancellations. Thus, using preset instructions from, e.g., a supervisor, a company or other entity can audit audio communications involving agents based on preset external triggers, such as customer cancellations or complaints to a customer care website. The preset instructions may then be to search transcripts for particular words or phrases that could indicate a pattern of abusive agent behavior.

Similarly, a company can correlate call transcripts with customer visits to a customer care website in order to match and integrate the customer contacts. In this way, customer behavior can be fully analyzed, such as to identify particular customers or types of customers who find it easier to communicate with a company via a customer care website. The process may include providing preset instructions to identify customers visiting a customer care website, identifying previous calls from the customers to agents, transcribing the previous calls, analyzing the transcripts of the previous calls to identify problems the customer encountered, and then notifying a supervisor or agent to interact with the customer on the customer care website to resolve the problems encountered in the previous call(s). In this way, customer calls can be correlated with website visits and other types of information in order to identify and address problems from the customer calls.

Figure 5:
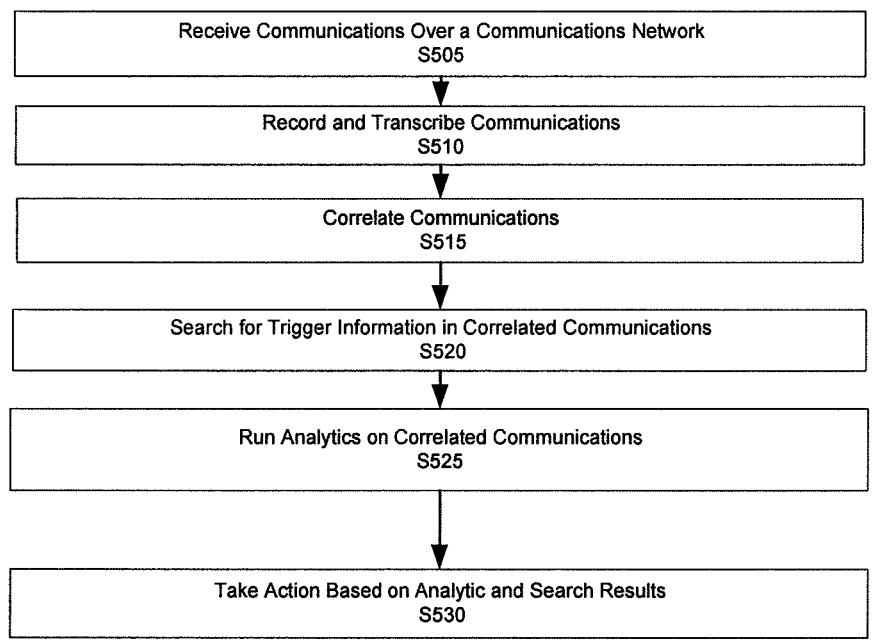
FIG. 5 shows another method for multi-level content analysis and response, according to an aspect of the present disclosure.

FIG. 5 shows another method for multi-level content analysis and response, according to an aspect of the present disclosure. In FIG. 5, communications are received over a communications network at S505. At S510, the communications are recorded and transcribed. At S515, the communications are correlated, such as by identifying metadata and/or terminology that meets preset instructions. At S520, a search is made for trigger information in the correlated communications. At S525, analytics are run on the correlated communications. At S530, an action is taken based on the analytics and search results.

An example of the multi-level content analysis and response using the process of FIG. 5 includes a stock broker. In this example, a customer makes multiple calls to a stock broker's office to place orders to buy and/or sell stocks. The calls can be recorded even when someone answers the phone and takes the orders using, e.g., AT&T Audited Communications. When the customer is audited, the stock broker can order transcription of each of the recorded calls at S510. The calls can be correlated with specific stock trades on specific dates. Even when all calls to the stock broker are recorded and transcribed for all customers, the broker can correlate calls for a particular customer account (as a keyword) and for particular dates or date ranges to selectively identify transcripts to analyze. In this way, the recorded audio can be transcribed and correlated based on keywords. The stock broker or other agent of the brokerage can be emailed with correlated text either from the transcripts or with information from trade records identified based on correlations to the transcripts. The stock broker can then analyze an email list of requested trades identified from transcripts and compare the requested trades with executed trades for the audit.

In the voicemail pharmacy example described above, a communication may be a voicemail and the transcribed voicemail may be correlated with preset instructions from the pharmacy such as to search for prescription refill requests. At S520, the transcript and/or metadata for the communication are searched for trigger information. Trigger information may be terminology that indicates a refill request, or may be a source address from which the voicemail is received. Analytics may be run on the correlated communication, such as by identifying a refill request and then analyzing customer or prescription records to confirm that the refill request can be honored. The action taken at S530 may be a communication to the pharmacy advising that the refill has been requested and should be honored (or not honored).

In another example, the voicemail may be received by an individual, and the voicemail may be transcribed and correlated with preset instructions. For example, an individual may receive many voicemails and may wish to only immediately respond to a limited set of such voicemails. An example would be voicemails that use the term "emergency" or "important". The individual may have preset instructions that such voicemails from a particular set of people (e.g., family members or patients) should be processed immediately. Therefore, if the voicemails come from communications addresses listed in the preset instructions, the voicemail transcripts can be searched for triggers and analyzed. An action such as a text to the individual can be taken based on the search and analysis. In the event of a test or email being sent to the subscriber, the text or email may even include the transcript, a partial transcript, a copy of the voicemail, or a link to a stored copy of any of the transcript/partial transcript/voicemail.

Figure 6:
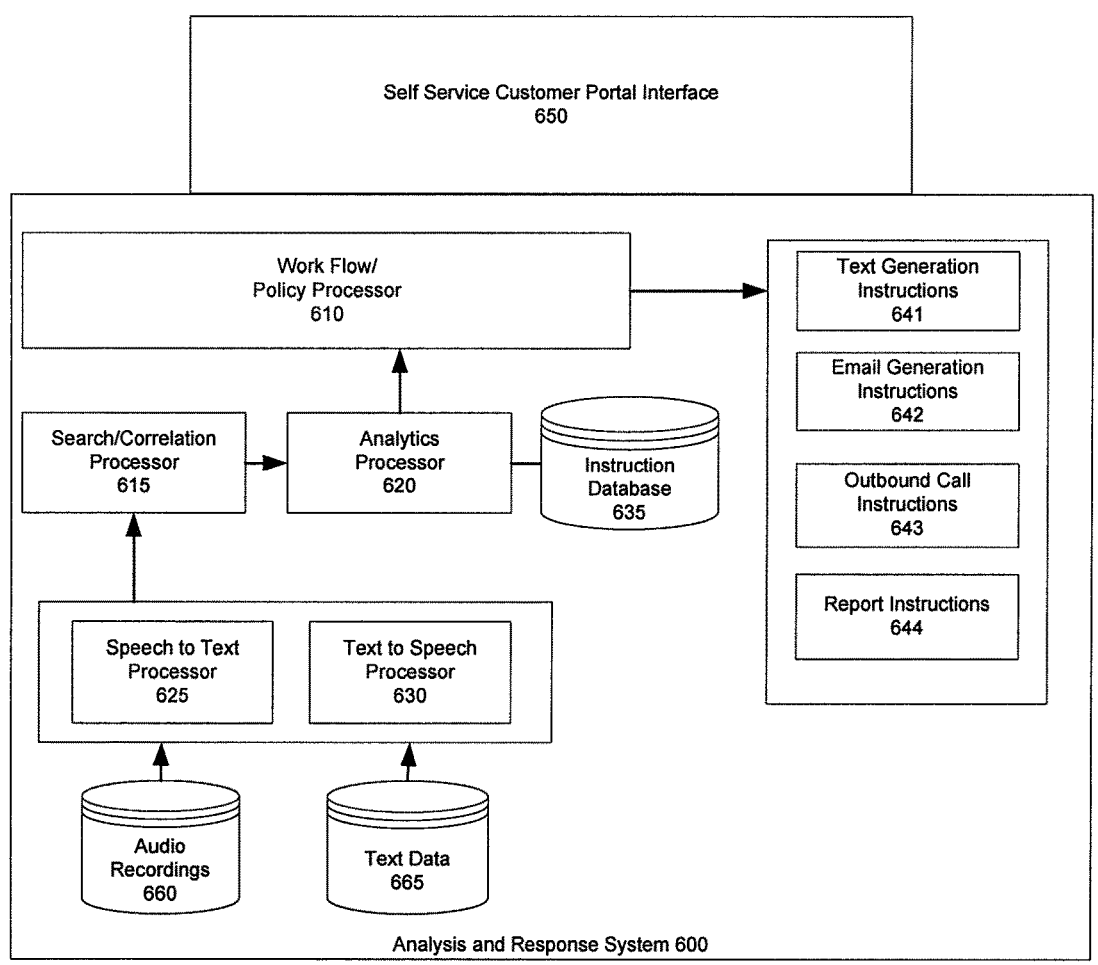
FIG. 6 shows a system for multi-level content analysis and response, according to an aspect of the present disclosure.

FIG. 6 shows a system for multi-level content analysis and response, according to an aspect of the present disclosure. In the description of FIG. 6 that follows, the system includes speech to text capability via a speech to text processor 625. The processor 625 has a capability that will be used to convert live transmissions and/or recorded audio to text for correlation with preset instructions and analytics as described herein. The system of FIG. 6 also has a search capability for searching through a transcript and correlating, e.g., words and phrases, with preset instructions. This search and correlation functionality will take as input search criteria such as keyword/phrases provided as preset instructions. The preset instructions may also specify dates and times of transmissions and recordings that should be searched, originating addresses such as telephone numbers or other communications addresses and even television and radio channels. The preset instructions may also specify a particular subscriber account number, such as a particular voicemail address for which messages should be transcribed and analyzed. Moreover, the preset instructions may also specify a search medium such as voicemail, email, video, social media, television and/or radio.

In FIG. 6, an analytics engine (processor) 620 performs predefined analytics on correlated collected data based on search criteria. A database 635 stores the preset instructions, analytics and/or correlation results. A work flow/policy engine (processor) 610 has a capability to perform preconfigured action based on the preset instructions and the analytic results. Actions to take based on the preset instructions include generating a report, sending a text or email, triggering an outbound call that plays an audio using the text to speech capability, or a simple text results that is embedded in a report. An example of the outbound call action would be when a particular voicemail left at a work telephone number is transcribed and analyzed, and identified as a voicemail that should be copied and sent to the personal telephone number of a person responsible for the work telephone number.

In FIG. 6, a customer can use a self-service customer portal 650 to set preset instructions. The self-service customer portal 650 is used for self service by customers, and can be used to change the preset instructions, change customer information, change a subscription by which the multi-level content analysis is provided, or even review one or more pieces of content that matches preset instructions.

In the embodiment of FIG. 6, audio recordings are stored at database 660 and text data is stored at database 665. The audio recordings may be, as described above, voicemails to a voicemail number belonging to the customer. The text data may be emails sent to an email address belonging to the customer. The audio recordings can be converted to text, and text likewise can be converted to speech by processors 625 and 630 respectively.

A search/correlation processor 615 correlates incoming audio and text with preset instructions, and analytics processor 620 can analyze text such as email or transcripts of audio. The preset instructions can be stored in instruction database 635. A work flow/policy processor 610 analyzes the preset instructions and the analytic and search results and identifies an action to take, if any. 641 is a set of text generation instructions that can be used to send a text to the subscriber. 642 is a set of email generation instructions that can be used to send an email to the subscriber. 643 is a set of outbound call instructions that can be used to initiate an outbound call to the subscriber. 644 is a set of report instructions that can be used to generate a report for later reference by the customer.

As described above for FIG. 6, a speech to text capability is provided to convert recorded audio to text for correlation and analytics. A search and correlation functionality takes as input search criteria such as keywords or phrases, or even date and time and/or source address (e.g., phone number or IP address) or account number, and selectively searches a transcript of recorded audio, emails, video or even social media or other sources of online audio content. An analytics engine performs predefined analytics on collected data based on search criteria. A database is used to store analytics and/or correlation results. A work flow/policy engine performs the preconfigured actions based on the analytic results. The preconfigured actions can be generating a report, sending an email, triggering an outbound call that plays an audio using text to speech capability, or even a simple text result that embeds text or audio or a link in a report or communication such as a text message.

Figure 7:
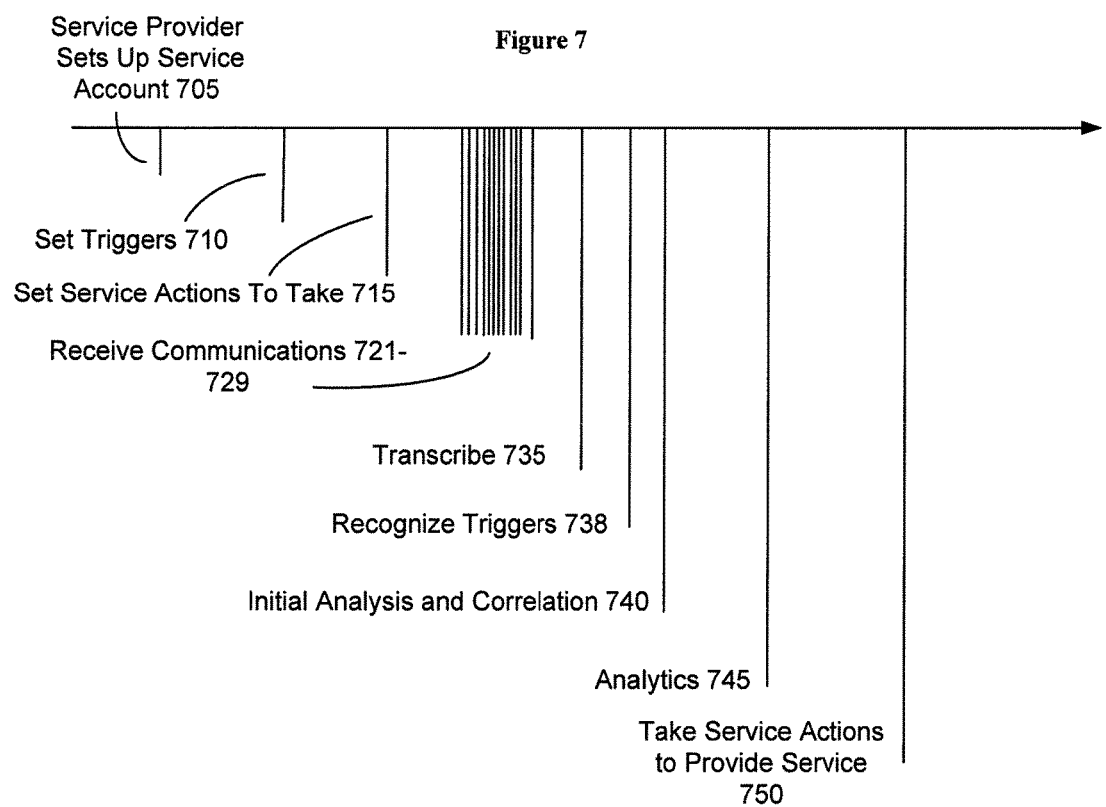
FIG. 7 shows a timeline of actions for multi-level content analysis and response, according to an aspect of the present disclosure.

FIG. 7 shows a timeline of actions for multi-level content analysis and response, according to an aspect of the present disclosure. In FIG. 7, the timeline starts with a service provider setting up a service account at 705. Triggers are set at 710. Service actions to take based on the triggers are set as preset instructions at 715. At 721-729, communications are received. At 735 the communications are transcribed. At 736, triggers are recognized. At 740, an initial analysis take place and the communications are correlated with the preset instructions. At 745, analytics of the communications are performed. At 750, the service actions are taken in accordance with the preset instructions.

An example of the timeline of FIG. 7 is a customer care site. A customer care site may accept instructions from a customer such as a voicemail or cable television subscriber. The customer can then set instructions to be notified when particular content meets the instructions, such as when voicemails are received at a business phone during off hours, or when voicemails are received from a particular person (e.g., family member) during the night. The customer can request notifications any times a transcript meets a preset parameter, or only when a transcript includes a word or term that meets a preset parameter. In this way, a customer can elect not to review voicemails from even a family member unless the voicemail includes a phrase such as "this is an emergency" or "please call".

Additionally, multi-level content analysis and response can be used for services involving human or automated agents, such as those provided by call centers or interactive voice response services. Agent communications typically involve the agents following a script of instructions and content that varies based on input provided by a caller. Some or all agent communications may be captured by a company that provides call services, and the communications can be selectively transcribed and analyzed as described herein. For example, a corporation or other entity may wish to review all agent communications that occur on a particular date, or that involve a particular agent or particular customer. Audio recording capabilities described herein can be provided by AT&T services such as Audit Communications, where agent communications are recorded and can be selectively audited using the parameters described herein. Natural language processing can be used to analyze audio content recorded on an electronic recording medium.

Figure 8:
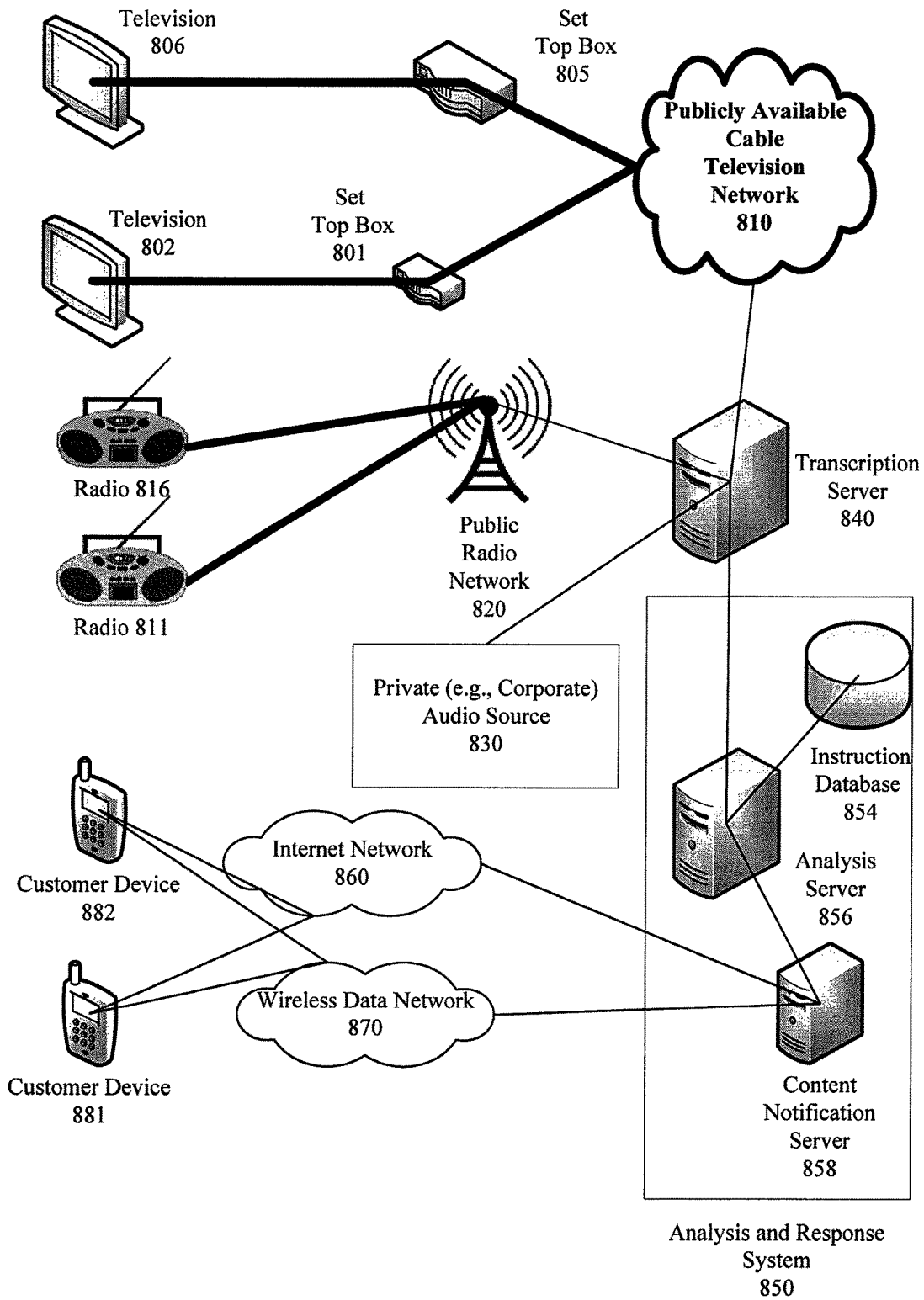
FIG. 8 shows a network for multi-level content analysis and response, according to an aspect of the present disclosure.

FIG. 8 shows a network for multi-level content analysis and response, according to an aspect of the present disclosure. In FIG. 8, television 806 and 802 receive cable television signals from a publicly available cable television network 810 via set to boxes 805 and 801. Radios 816 and 811 receive radio signals via a public radio network 820. Broadcast content from the publicly available cable television network 810 and public radio network 820 is provided to transcription server 840. In FIG. 8, the publicly available cable television network 810 and public radio network 820 are merely representative of the kinds of broadcast content that can be transcribed and analyzed as described herein. Other kinds of broadcast content that can be transcribed and used as described herein include satellite television content, internet television content, internet radio content, traditional over-the-air (OTA) wireless television content and so on.

In FIG. 8, a private audio source 830 also provides audio content to transcription server 840. The private audio source 830 may be an electronic device or system of devices that provides audio from a conference entity such as a hotel, conference center, conference organizer, or company. The private audio source 830 may also be an electronic device or system of devices that provides audio from an entity such as a religious organization, school, government agency, or other entity that provides audio content that may be of interest to individuals using the multi-level content analysis and response described herein.

An example of how multi-level content analysis and response would be used using the embodiment of FIG. 8 could include a subscriber who wants to be notified when a particular term is used on a business television channel or radio channel. For example, a market technician may provide a preset instruction to be notified whenever the term "DeMark" is used on one or more particular television and/or radio channels. The preset instruction may also be to provide a transcript of the segment in which the term is used, or even a copy of or a link to all or some of the segment.

Figure 9:
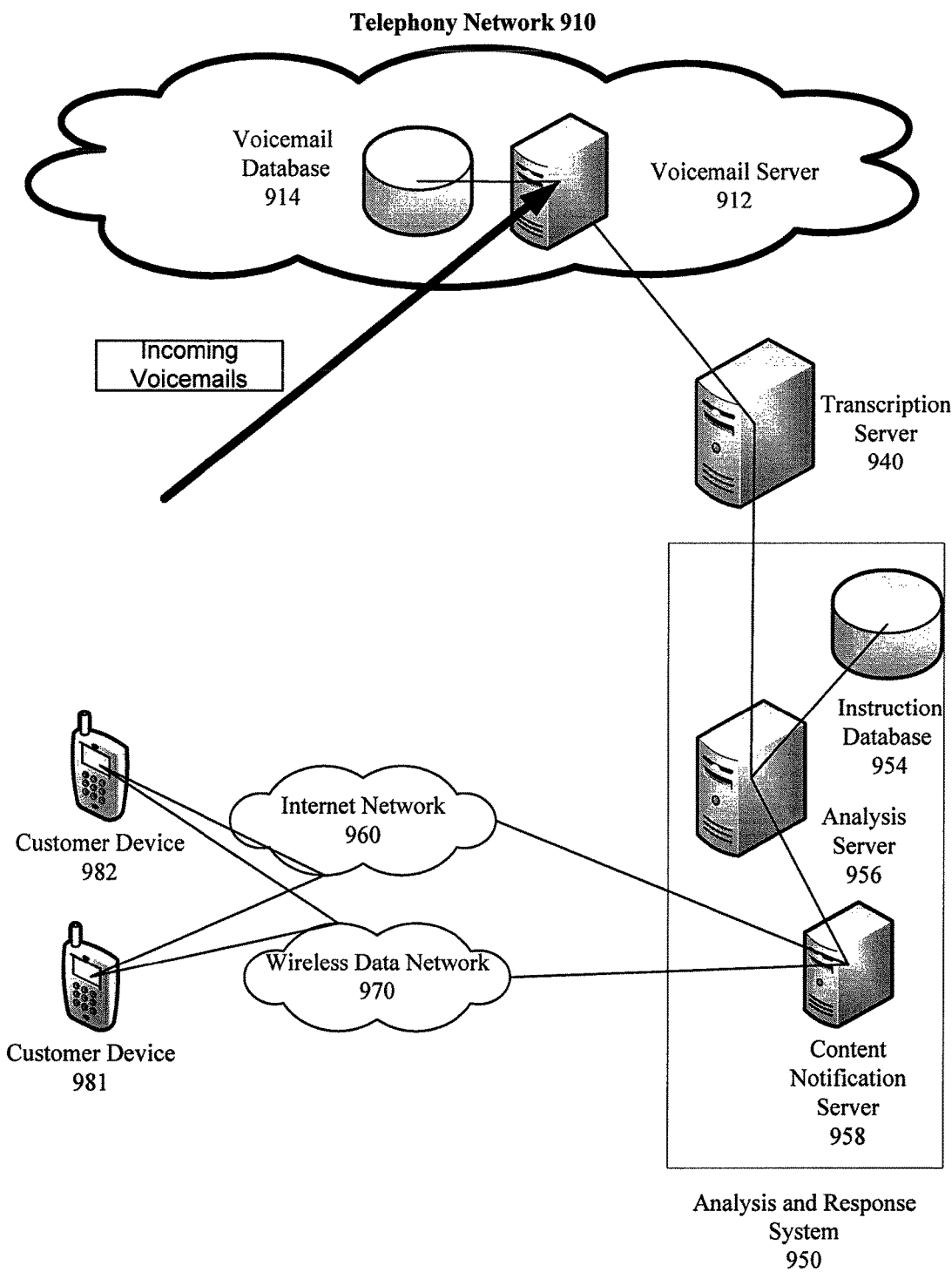
FIG. 9 shows another network for multi-level content analysis and response, according to an aspect of the present disclosure.

FIG. 9 shows another network for multi-level content analysis and response, according to an aspect of the present disclosure. In FIG. 9, a telephony network 910 includes a voicemail server 912 and a voicemail database 914. Voicemails are received in the telephony network 910 and stored in the voicemail database 914. A multi-level content analysis and response system accesses the voicemails via the voicemail server 912.

It should be made clear in the embodiment of FIG. 9 that the Figure describes voicemails stored by a telephony provider such as a wireless carrier. However, voicemails stored on internal systems such as in a corporate or home telephone system can also be analyzed in accordance with the descriptions herein. For example, a law firm or hospital may subscribe to a multi-level content analysis and response service so that employee voicemails are analyzed. Any entity that subscribes to such a multi-level content analysis and response system may specify that all voicemails for all employees are to be analyzed, all voicemails for some but not all specified employees are to be analyzed, or some but not all voicemails for some but not all employees are to be analyzed. For example, a subscriber entity may specify that after-hours voicemails for particular executives from pre-identified phone numbers are to be analyzed. In this way, executives can ensure, for example, that voicemails from counterparts at other companies are analyzed, so that important voicemails are not left unanswered even when left at times and/or dates when the subscriber entity is not open.

One benefit of the multi-level content analysis and response system for a voicemail subscriber is that a subscriber does not have to answer all calls from even familiar or expected numbers, or listen to all messages from even just the familiar or expected numbers, in order to ascertain importance. Rather, a subscriber can identify that voicemail messages with content that meets specific criteria should be retrieved and forwarded. Indeed, in this way a subscriber can tell others to use a code word in a voicemail message if the others need to be sure the message is forwarded immediately to the subscriber. The subscriber can then leave preset instructions that any voicemail that includes the code word is to be forwarded to the subscriber immediately, or that the subscriber is to be notified of the voicemail immediately. a In FIG. 9, a transcription server 940 transcribes voicemails from the voicemail system that includes the voicemail database 914. An analysis and response system 950 then analyzes the transcript, and determines whether a transcript meets preset instructions from the subscriber for which the voicemail was left. An analysis server 956 matches content from the transcript with preset instructions in an instruction database 954, and if a match is found, the action to be taken is initiated. In FIG. 9 the action is a notification to be initiated by the content notification server 958, which pushes a notification to the subscriber by either or both of the internet network 960 or the wireless data network 970. The customer can then receive the notifications on customer devices 981 or 982.

In FIG. 9 the exemplary customer devices are shown to be smart phones that communicated via voice, text and data. However, notifications can also be received by other types of customer devices, including landline computers, laptop computers, or even via smart televisions.

Accordingly, multi-level content analysis and response enables a person or organization to provide preset instructions to be followed when a transcript analysis matches preset triggers. As described herein, the person or entity can be a subscriber that subscribes to a transcript analysis and matching service. In this way, the person or entity can be notified when particular audio content is identified that matches preset instructions, when a particular action is taken based on a preset instruction following a match, when a particular speaker speaks in a particular forum or via a pre-identified source, or when a particular subject comes up on a pre-identified medium or in a pre-identified source. The person or entity can receive a simple notification of the action or the match, or may receive a copy or a link to an audio or video recording in which the match occurs. In this way, smart transcription and smart analysis of transcripts can be used to provide individuals and entities with content that exactly matches their interest, and ensure that actions are taken when smart analysis of a transcript results in a match with preset instructions.

Although multi-level content analysis and response has been described with reference to several exemplary embodiments, it is understood that the words that have been used are words of description and illustration, rather than words of limitation. Changes may be made within the purview of the appended claims, as presently stated and as amended, without departing from the scope and spirit of multi-level content analysis and response in its aspects. Although multi-level content analysis and response has been described with reference to particular means, materials and embodiments, multi-level content analysis and response is not intended to be limited to the particulars disclosed; rather multi-level content analysis and response extends to all functionally equivalent structures, methods, and uses such as are within the scope of the appended claims.

For example, examples described herein include analysis of voicemails, television, radio and private audio content. However, analysis can be provided for any audio that is captured on an electronic medium and subject to transcription. Such audio can be from:

- speeches
- lectures
- conferences
- voicemails recorded on a service provider voicemail mailbox
- voicemails recorded on a customer premise mailbox or answering machine
- audio sent by email
- audio received via television, including over the air (OTA) or cable or internet television
- audio received via radio, including over the air (OTA) or cable or internet radio
- audio received from a satellite system Further, actions to take as described herein have chiefly involved notifications to users; however, some actions that might be taken could involve automated actions beyond notifications. For example, a parental control action can be taken when transcripts of a supposed "child-safe" cable channel reveal the use of too many curse words or too much discussion of topics deemed inappropriate by some parents or guardians. In this example, the use of a particular word or words a specified number of times in a period might result in a channel or show being automatically blacklisted and blocked in a parental control program that follows preset instructions from the parents or guardians.

Further, in the context of user-specific voicemails, a transcript will be particular to the voicemail and useful mostly to only the recipient. However, in the case of broadcasting systems such as television or radio, the transcription and analysis described herein can be performed by the content provider that provides a show. Alternatively, the transcription and analysis described herein can be performed by a broadcaster that broadcasts content from multiple different content provider sources. The transcription and analysis can also be performed by a cable or satellite provider that provides cable or satellite service from multiple independent broadcasters, that each in turn broadcast content from multiple different content provider sources. Of course, transcription and/or analysis can be performed by a third party as a contract service for end-users, for content providers, for broadcasters, and/or for the cable or satellite providers.

In the examples involving broadcasts, such as shown in FIG. 8, the same transcript can be analyzed for multiple different requesters who each provide a different set of preset instructions. Indeed, some requesters may have the same or similar preset instructions, so that the same action such as a notification can be taken for multiple users as a group. In this example, different actions can also be taken for different subscribers based on the same transcript. For example, some subscribers may wish to receive notifications when a particular issue such as "Ebola" or "Autism" is discussed on a news network, whereas other subscribers may wish to receive notifications when a particular person such as "Axelrod" is mentioned on the news network. For a single broadcast such as the evening news, different subscribers may receive notifications and even links or copies to different parts of the broadcast based on analysis of the transcript of the single broadcast.

Additionally, a self-service customer portal such as 650 in FIG. 6 may provide preset choices of actions for customers to take. For example, viewers of a particular television channel or subscribers to a particular cable or satellite provider may be presented with options to be notified when any particular name is mentioned on the news. The self-service customer portal may present the customer with the option to input the name, input the channel, input particular shows to monitor for the name, and so on. Similarly, an online video service can also provide such a self-service customer portal for users to search through archived video, in which case transcripts of a particular video or series of videos can be made on-demand if they do not already exist.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular systems and mediums, the disclosure is not limited to such standards and protocols. For example, the audio systems from which transcripts can be provided are not only voicemail, television, radio and private sources. Rather, content from internet sources, including internet radio and video sources, can also be transcribed and analyzed to see if the content matches preset instructions.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In accordance with an aspect of the present disclosure, a method of providing a predetermined service uses preset instructions. The method includes analyzing a transcript of audible content provided over an electronic network and received at a communications device to determine whether a trigger is present in the audible content. The method also includes, when the trigger is present in the audible content, identifying preset instructions correlated with the trigger and instructing how to provide a predetermined service. The predetermined service is provided by following the preset instructions.

In accordance with another aspect of the present disclosure, the method includes providing the predetermined service in accordance with the preset instructions.

In accordance with yet another aspect of the present disclosure, the preset instructions are received by a service provider from a first party to correlate speech instructions with actions to take in accordance with the preset instructions.

In accordance with still another aspect of the present disclosure, the audible content is a voicemail received by the first party from a second party.

In accordance with another aspect of the present disclosure, the audible content is from a television broadcast.

In accordance with yet another aspect of the present disclosure, the service provider analyzes the voicemail, determined the trigger has been triggered, and identifies the preset instructions.

In accordance with still another aspect of the present disclosure, the service provider follows the preset instructions to provide the service.

In accordance with another aspect of the present disclosure, the service provider provides the present instructions to a third party to ensure the service is provided.

In accordance with yet another aspect of the present disclosure, the method includes setting the preset instructions based on instructions from the first party received over the electronic network.

In accordance with still another aspect of the present disclosure, the preset instructions are correlated with the trigger by setting terminology as the trigger, and providing actions to take when set terminology is received.

In accordance with another aspect of the present disclosure, the method includes identifying a source communication address from which the audible content is sent; and retrieving preset instructions based on the source communication address.

In accordance with yet another aspect of the present disclosure, the method includes retrieving the trigger based on retrieving the preset instructions, and analyzing the transcript for the trigger.

In accordance with still another aspect of the present disclosure, the trigger includes a trigger word.

In accordance with another aspect of the present disclosure, the trigger includes a location determined based on the source communication address.

In accordance with yet another aspect of the present disclosure, the trigger includes a date and time at which the audible content is provided.

In accordance with still another aspect of the present disclosure, the method includes analyzing transcripts of additional audible content; and correlating the audible content with the additional audible content that has been analyzed. The predetermined service is provided by following the preset instructions for all the correlated audible content.

In accordance with another aspect of the present disclosure, the predetermined service includes generating and sending an alert based on the present instructions.

In accordance with another aspect of the present disclosure, the method includes analyzing transcripts of additional audible content; correlating the audible content with the additional audible content that has been analyzed; and running analytics for the audible content and the additional audible content. The service includes identifying information from the audible content and the additional audible content based on the analysis of the transcripts and analytics run for the audible content and the additional audible content.

In accordance with an aspect of the present disclosure, a tangible computer readable storage medium stores a computer program. The computer program, when executed by a processor, causes a computer apparatus to perform a process including analyzing a transcript of audible content provided over an electronic network and received at a communications device to determine whether a trigger is present in the audible content. When the trigger is present in the audible content, the process includes identifying preset instructions correlated with the trigger and instructing how to provide a predetermined service. The predetermined service is provided by following the preset instructions.

In accordance with an aspect of the present disclosure, a computer apparatus includes a memory that stores instructions, and a processor that executes the instructions. When executed by the processor, the instructions cause the processor to perform operations including analyzing a transcript of audible content provided over an electronic network and received at a communications device to determine whether a trigger is present in the audible content. When the trigger is present in the audible content, the operations include identifying preset instructions correlated with the trigger and instructing how to provide a predetermined service. The predetermined service is provided by following the preset instructions.

As described above, the present disclosure teaches a solution that can provide companies with the capability to search and correlate data across different communications modes. This disclosure enables the ability to correlate across audio and video without the need to physically listen through all audio calls or watch through all videos. This disclosure can be used to improve customer service, and even provide automated or partially-automated customer services. This disclosure can also to be used as a conduit to aggregate customer input for product improvements.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing a predetermined service using preset instructions, comprising:
   receiving, at a communications device, audible content over an electronic network;
   determining whether a triggering condition is present or not for the audible content received;
   when the triggering condition is determined to be present, performing transcription of the audible content;
   when the triggering condition is determined not to be present, no transcription of the audible content is performed;
   when the transcription is performed, analyzing the transcription of the audible content to determine whether a trigger is present in the transcription of the audible content; and
   when the trigger is present in the transcription of the audible content, identifying preset instructions correlated with the trigger and providing a predetermined service,
   wherein the predetermined service is provided by following the preset instructions, and
   wherein the triggering condition includes at least one of a source communication address from which the audible content is sent, and a time at which the audible content is received.

2. The method of claim 1,
   wherein the preset instructions are received by a service provider from a first party to correlate speech instructions with actions to take in accordance with the preset instructions.

3. The method of claim 2,
   wherein the audible content is a voicemail received by the first party from a second party.

4. The method of claim 2, wherein the audible content is from a television broadcast.

5. The method of claim 2, wherein the service provider analyzes the voicemail, determines that the trigger has been triggered, and identifies the preset instructions.

6. The method of claim 5,
   wherein the service provider follows the preset instructions to provide the predetermined service.

7. The method of claim 5,
   wherein the service provider provides the preset instructions to a third party to ensure the predetermined service is provided.

8. The method of claim 2, further comprising:
   setting the preset instructions based on instructions from the first party received over the electronic network.

9. The method of claim 1,
   wherein the preset instructions are correlated with the trigger by setting terminology as the trigger, and providing actions to take when set terminology is received.

10. The method of claim 1, further comprising:
    when the triggering condition is the source communication address, retrieving preset instructions based on the source communication address.

11. The method of claim 10, further comprising:
    retrieving the trigger based on retrieving the preset instructions; and
    analyzing the transcription for the trigger.

12. The method of claim 11,
    wherein the trigger comprises a trigger word.

13. The method of claim 10,
    wherein the trigger comprises a location determined based on the source communication address.

14. The method of claim 10,
    wherein the trigger comprises a date and time at which the audible content is provided.

15. The method of claim 1, further comprising:
    analyzing transcripts of additional audible content; and
    correlating the audible content with the additional audible content that has been analyzed,
    wherein the predetermined service is provided by following the preset instructions for all correlated audible content.

16. The method of claim 1,
    wherein the predetermined service comprises generating and sending an alert based on the preset instructions.

17. The method of claim 1, further comprising:
    analyzing transcripts of additional audible content;
    correlating the audible content with the additional audible content that has been analyzed;
    running analytics for the audible content and the additional audible content,
    wherein the predetermined service comprises identifying information from the audible content and the additional audible content based on the analysis of the transcripts and analytics run for the audible content and the additional audible content.

18. A tangible computer readable storage medium that stores a computer program, the computer program, when executed by a processor, causing a computer apparatus to perform a process comprising:
    receiving audible content over an electronic network;
    determining whether a triggering condition is present or not for the audible content received;
    when the triggering condition is determined to be present, performing transcription of the audible content;
    when the triggering condition is determined not to be present, no transcription of the audible content is performed;
    when the transcription is performed, analyzing the transcription of the audible content to determine whether a trigger is present in the transcription of the audible content; and when the trigger is present in the transcription of the audible content, identifying preset instructions correlated with the trigger and providing a predetermined service, wherein the predetermined service is provided by following the preset instructions, and wherein the triggering condition includes at least one of a source communication address from which the audible content is sent, and a time at which the audible content is received.

19. A computer apparatus, comprising:

a memory that stores instructions, and a processor that executes the instructions, wherein, when executed by the processor, the instructions cause the processor to perform operations comprising:

receiving audible content over an electronic network;

determining whether a triggering condition is present or not for the audible content received;

when the triggering condition is determined to be present, performing transcription of the audible content;

when the triggering condition is determined not to be present, no transcription of the audible content is performed;

when the transcription is performed, analyzing the transcription of the audible content to determine whether a trigger is present in the transcription of the audible content; and when the trigger is present in the transcription of the audible content, identifying preset instructions correlated with the trigger and providing a predetermined service, wherein the predetermined service is provided by following the preset instructions, and wherein the triggering condition includes at least one of a source communication address from which the audible content is sent, and a time at which the audible content is received.

\* \* \* \* \*